Dec. 30, 1924.
J. W. FRASER
RECTIFIER
Filed April 23, 1923
1,521,441
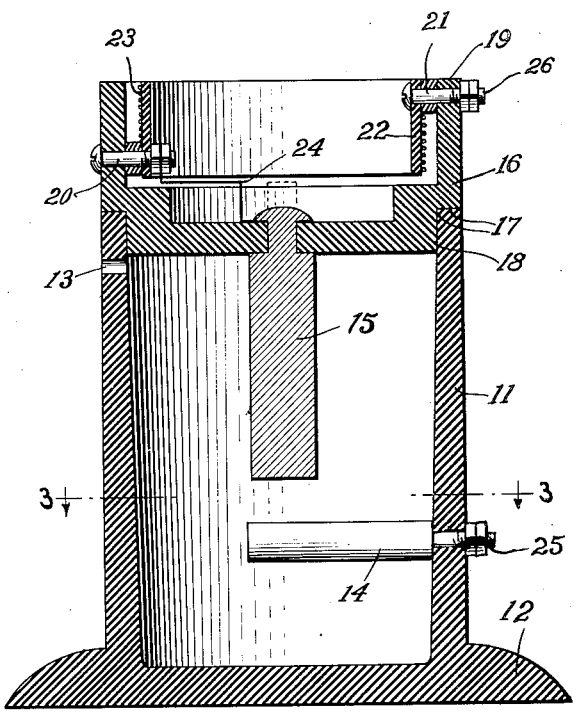
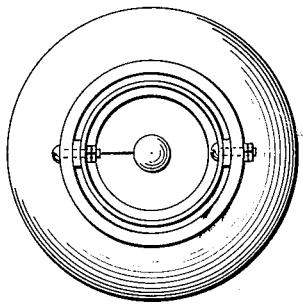
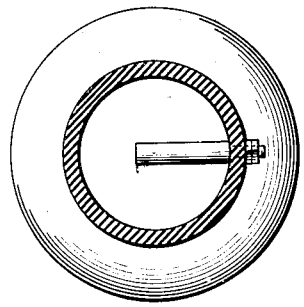
INVENTOR.
John W. Fraser
BY Smith and Freeman
ATTORNEYS.

Patented Dec. 30, 1924.

1,521,441

UNITED STATES PATENT OFFICE.

JOHN W. FRASER, OF CLEVELAND, OHIO.

RECTIFIER.

Application filed April 23, 1923. Serial No. 633,950.

*To all whom it may concern:*

Be it known that I, JOHN W. FRASER, a citizen of the United States, residing at Cleveland, in the county of Cuyahoga and State of Ohio, have invented a certain new and useful Improvement in Rectifiers, of which the following is a full, clear, and exact description, reference being had to the accompanying drawings.

My invention relates to rectifiers and particularly to the type of rectifier designed for use in charging what are commonly known as "B" batteries and the principal object of my invention is to provide a new and improved rectifier of this type. In the drawings accompanying this specification and forming a part thereof I have shown, for purposes of illustration, one form which my invention may assume. In these drawings:

Figure 1 represents a vertical section through this illustrative form of my invention, Figure 2 is a reduced scale plan view of the rectifier shown in Figure 1, while Figure 3 is a reduced scale section on the line 3—3 of Figure 1.

The rectifier herein disclosed comprises a jar 11, adapted to contain a suitable electrolyte, formed of any suitable material such as molded insulating plastic such as rubber or rubber composition, preferably provided with an enlarged base 12 to add stability to the rectifier, and provided with a vent 13 above the height of the electrolyte to permit escape of any gases formed during the operation of the rectifier. Carried by the side wall of this jar 11 is an electrode 14 spaced from the bottom of the jar 11 a distance sufficient to render unlikely contact between the electrode 14 and any sludge which has accumulated in the jar and at the same time spaced from the top of the jar 11, and particularly from the vent 13, a distance sufficient to permit operative emersion in the electrolyte of a second electrode 15 positioned above the electrode 14 in operative relation thereto and shown as carried by a cover 16 preferably formed of the same material as the jar 11, cut away on its lower face to form an annular surface 17 adapted to engage and rest upon the top of the jar 17 and an annular shoulder 18 adapted to closely engage the inner surface of the jar 11, and provided on its upper face with an upstanding annular flange 19 arranged to support, by means of two bolts 20 and 21, a resistance wire carrier 22 which in turn carries a resistance coil 23 one end of which is connected to the bolt 20 and the other end to the bolt 21. A wire 24 connects the bolt 20 with the electrode 15 thus connecting the resistance in series with the electrodes between the terminal 25 of the electrode 14 and the terminal 26 of the bolt 21. The resistance support may be made of any suitable material such as porcelain or a material similar to that used for the jar 11 and, if desired, the resistance wire may be imbedded within the support rather than wound thereon. The resistance wire may be made of any material suitable for the purpose and similarly the electrodes 14 and 15 may be of any proper materials, for example, the electrode 14 may be aluminum and the electrode 15 may be lead.

It will be obvious to those skilled in the art that the rectifier herein disclosed is eminently suitable for many purposes including the particular purpose for which it was specifically designed and that it is in convenient and compact form. It will also be obvious to those skilled in the art that the particular embodiment herein disclosed may be variously modified without departing from the spirit of my invention and accordingly this disclosure is illustrative only and my invention is not limited thereto.

I claim:

1. A rectifier comprising a jar, electrolyte therein, a cover for said jar, an electrode carried by said jar and extending into said electrolyte, and an electrode carried by said cover and extending into said electrolyte into functioning proximity to the electrode carried by said jar.

2. A rectifier comprising a jar, electrolyte therein, a cover for said jar, an electrode carried thereby in position to extend into said electrolyte, and a resistance carried on said cover and having one terminal connected to said electrode.

3. A rectifier comprising a jar, electrolyte therein, a cover for said jar, an electrode carried by said jar and extending into said electrolyte, an electrode carried by said cover and extending into said electrolyte into functioning proximity to the electrode carried by said jar, and a resistance carried on said cover and having one terminal connected to the electrode carried by said cover.

In testimony whereof I hereunto affix my signature.

J. W. FRASER.